June 2, 1964  W. L. LINDLEY  3,135,556
INTEGRAL WHEEL, DRUM, AND TIRE RIM FOR A VEHICLE
Filed Feb. 1, 1962
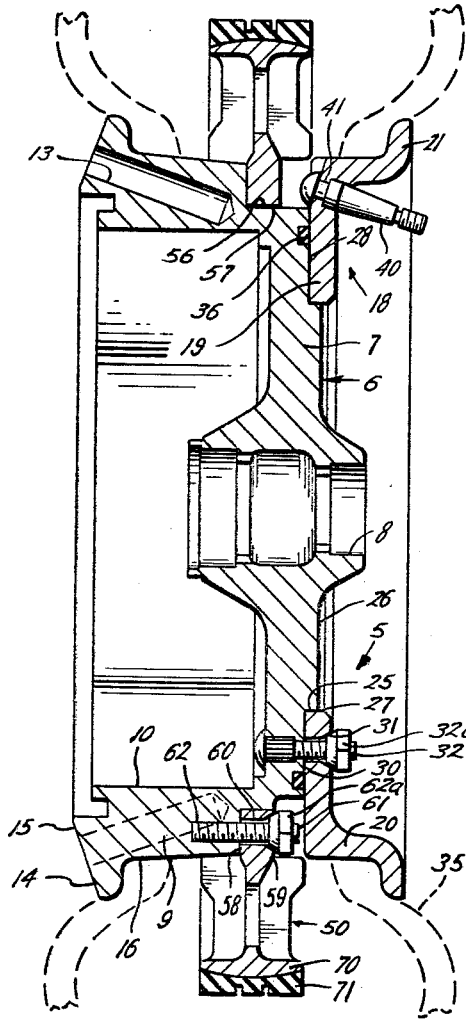
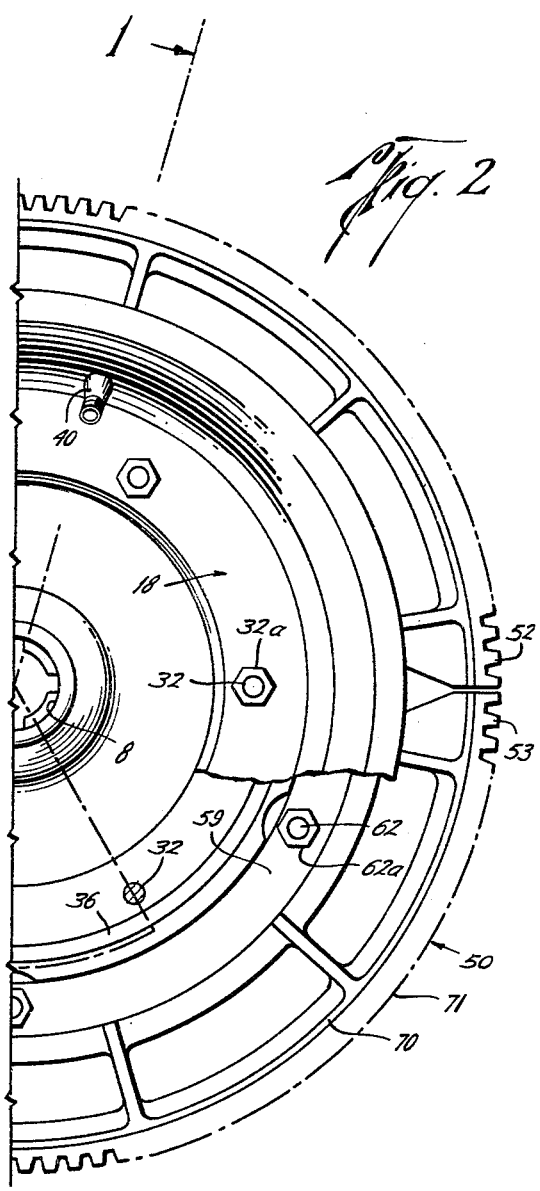
William L. Lindley
INVENTOR.
BY Hayden & Pravel
ATTORNEYS

United States Patent Office 3,135,556
Patented June 2, 1964

3,135,556
INTEGRAL WHEEL, DRUM, AND TIRE RIM
FOR A VEHICLE
William L. Lindley, P.O. Box 12013, Houston 17, Tex.
Filed Feb. 1, 1962, Ser. No. 170,434
1 Claim. (Cl. 301—6)

The present invention relates to an improved wheel, tire rim, and brake drum.

Wheels used on vehicles at the present time are formed by providing a drum which is secured on the axle of the vehicle. This drum provides a surface against which the brake functions and also provides a support on which the tire rim and remainder of the wheel are mounted. When a flat tire is encountered, the wheel portion including the tire rim is removed from the drum and the tire then forcibly removed from the rim.

In present day tire constructions where tubeless tires are employed, it is necessary that a seal between the edge of the wheel rim and the edge of the tire be maintained to insure retention of the tire at its proper inflation. In order to remove the tire from the wheel rim, mechanical devices are employed which force the edge of the tire away from the wheel rim and then each edge of the tire is progressively and forcibly removed over one edge of the tire rim. Removal of the tire in this manner tends to damage the tire, thereby making it more difficult to form a seal between the edge of the tire and the tire rim when the tire is repositioned on the rim.

Also, the size of the tire opening in relation to the tire rim is such that it is extremely difficult for the tire to be removed from the rim in the absence of special mechanical equipment normally found only at service stations or tire stores where the removal and replacement of the tires are accomplished. This makes is substantially impossible for the average vehicle operator to change a tire or repair a flat when on the highway or even in the city. Thus, in the absence of a spare tire, the vehicle operator and the vehicle are substantially stranded when a flat occurs on one of the tires of the vehicle.

The present invention provides an arrangement which overcomes the above and other disadvantages encountered in present wheel and tire rim construction.

Another object of the present invention is to provide a wheel and tire rim construction which enables a vehicle operator to move along on a flat tire for a substantial distance without damage to the tire.

Still another object of the present invention is to provide an integral wheel, tire rim, and brake drum construction which facilitates the removal of the tire from the drum and which enables the tire to be moved along a surface even though it may be deflated.

Still another object of the present invention is to provide a wheel, tire rim, and brake drum construction which eliminates damage to the tire as it is changed for repair or replacement.

Yet a further object of the present invention is to provide a wheel and tire rim construction to enable the average operator of the vehicle to make a tire repair.

Other objects and advantages of the present invention will become more readily apparent from a consideration of the following description and drawings wherein:

FIG. 1 is a sectional view on the line 1—1 of FIG. 2 of the wheel of the present invention; and FIG. 2 is a partial side view of the invention shown in FIG. 1, partially broken away, to illustrate certain additional structural details in the present invention.

Attention is directed to FIG. 1 of the drawings wherein the invention is designated generally by the numeral 5. A cup-shaped member 6 includes a base 7 having the central aperture 8 therein for receiving the axle of a vehicle. Integrally formed on the base 7 of the cup-shaped member 6 is the annular projection 9 which provides on its inner surface 10 a continuous surface forming a drum against which the brakes of the vehicle may function. Circumferentially disposed in the annular projection 9 is a plurality of holes 13 which is provided to lessen the amount of metal required to form the invention 5 and also the openings 13 serve as a heat dissipating means to dissipate heat from the inner surface 10 against which the brakes of the vehicle frictionally engage to brake the vehicle.

An annular flange 14 is formed at the outer edge 15 of the annular projection 9 and extends upwardly above the outer annular surface 16 of the projection 9 as illustrated in FIG. 1 of the drawings. The annular flange 14 forms one edge of the tire rim on which a tire is adapted to be received and supported as will be described in greater detail hereinafter.

An annular flange designated generally by the numeral 18 includes the leg 19, the base 20, and the leg 21 as shown in FIG. 1 of the drawings. A recessed area 25 is provided in the surface 26 of the base 7 of the member 6 which recessed area includes the shoulder 27 and the surface 28 against which the surface 30 of the leg 19 is abutted as shown in FIG. 1 of the drawings.

An opening 31 is provided in the leg 19 of the flange 18, and a bolt 32 extending through the opening 33 in the base 7 of the member 6 is adapted to be received within the opening 31. A lug nut 32a is threadedly engaged on the bolt 32 as shown in FIG. 1 of the drawings so as to secure the flange 18 in position on the member 6.

When the flange 18 is secured in position as above described and as shown in FIG. 1 of the drawings, the leg 21 thereof forms the other edge of the tire rim for receiving a tire represented by the numeral 35 in FIG. 1 of the drawings.

In order to seal between the flange 18 and the member 6, suitable seal means as illustrated at 36 may be provided for fitting between the abutting surfaces 28 and 30 to inhibit leakage from the tire as will be described hereinafter.

A valve stem 40 may be secured in the flange 18 through the opening 41 provided in the flange as shown in FIG. 1 of the drawings whereby the tire may be inflated after it has been positioned on the tire rim.

If desired, the flange 18 may be ring shaped or it may be formed of two semicircular portions which when positioned on the member 6 form an annular ring about the member 6.

As described in my copending application filed on November 6, 1961 bearing Serial No. 150,262 entitled "Wheel Rim Attachment for a Tubeless Tire," suitable means as represented by the numeral 50 may be provided for supporting the tire 35 when it is deflated. As described in my copending application immediately above referred to, the means 50 is constructed and arranged for fitting on a drop center rim. When employed in combination with the present invention, the semicircular portions 52 and 53, as shown in FIG. 2, are mounted on the outer annular edge of the member 6 substantially midway between the flange 14 and the leg 21 of the annular flange 18.

In order to mount the semicircular portions 52 and 53 in the manner above described, a recess 56 is provided in the outer surface 16 of the annular projection 9 as shown in FIG. 2 of the drawings. The recess 56 defines a base portion 57 and the edge or shoulder 58 against which the base 59 of each of the semicircular portions 52 and 53 abut. Circumferential openings 60 are provided in the base 59 whereby the threaded bolts 61 may be positioned therethrough and engaged in the threaded hole 62 formed in annular projection 9 to secure the portions 52 and 53 in place on the member 6. The construction and function of the portion 59 is described in my above referred invention, and it will be noted that the outer annular surface 70 is provided with a resilient covering 71 as described and claimed in my above referred to copending application.

It is to be noted that the member 50 projects radially from the member 6 a greater distance than the tire edge 14 and the tire rim edge 21 so that when the tire 35 becomes deflated, the resilient portion 71 will engage the inner surface of the tire and support it to prevent damage thereto.

While it is believed that the operation of the present invention is apparent from the foregoing description, it will be assumed that the member 6 is to be mounted on a vehicle, and in such instance, the axle of the vehicle will be inserted through the central aperture 8 and the member 6 secured thereon by means well known in the art. In order to position the tire 35 against the flange 14 and the flange 18, the semicircular portions 52 and 53 will, of course, be removed from the member 6. The portions 52 and 53 are first positioned in the tire 35, and the tire 35 then placed on the member 6 so that one edge of the tire abuts against the edge 14. The portions 52 and 53 within the tire may be manually grasped and lifted so that the bolt 61 may be threaded into the opening 62 to secure the portions 52 and 53 on the member 6. Thereafter, the annular flange 18 may be secured on the member 6 by threading the lug nut 32a on the bolt 32. Thereupon air may be discharged into the tire by means of the valve 40 to inflate and seat the tire 35 on the wheel.

If desired, the bolt 61 may be permanently threaded or fixed in openings 62, and lug nut 62a threadedly secured thereon to hold member 50 in position.

It will be noted that the outer surface 16 of the projection 9 may be tapered if desired in order to facilitate removal of the tire 35 from the member 6 for repair or replacement. The present invention also inhibits damage to the tire when it is removed or replaced and provides an arrangement which enables the operator of the vehicle to change the tire without any special equipment.

The member 50 when secured in position on the member 6 becomes an integral part thereof and provides an arrangement which along with the other components described herein inhibits damage to the tire and protects it when deflated. It enables the operator of the vehicle to drive the vehicle a substantial distance to a location where the deflated tire may be changed without hazard and without interfering with the normal flow of traffic.

The member 6 is shown as being solid; however, it can be appreciated that if desired suitable fins may be provided to lessen the weight of the invention 5 and to provide for heat dissipation both from the tire and from actuation of the brakes. The member 6 as well as the flange 18 and the member 50 may be formed of any suitable material, and aluminum serves the purposes quite well as it is extremely light and of sufficient strength to withstand the use to which the present invention would be put.

Broadly, the present invention relates to an improved wheel, tire rim, and brake drum which are integral and overcomes many objections and difficulties encountered with previous constructions of this type.

What is claimed is:

An integral wheel, tire rim, and brake drum for a vehicle including, a generally cup-shaped member having a base and an annular projection, said integral annular projection having an inner surface thereon forming a brake drum, an outer surface on said projection, an integral annular flange on the outer edge of said projection and extending upwardly above said outer surface and forming one edge of a tire rim, there being an annular recess in said outer surface of said annular projection defining a shoulder and a base, an annular member seated on said base of said recess and abutting said shoulder on said recess, means extending through said annular member and into said annular projection for securing said annular member on said cup-shaped member and against relative rotation between said cup-shaped member and annular member, said annular member extending radially from said cup-shaped member a greater distance than said annular flange, said annular member having an external circumferential resilient portion formed with laterally and radially extending spaced projections, an annular flange for securing to said cup-shaped member and having a leg which with said annular flange on said projection forms a tire rim, a recessed area on said base of said cup-shaped member providing a shoulder to support said annular flange on said cup-shaped member, and means extending through said annular flange and the base of said cup-shaped member for securing them together.

References Cited in the file of this patent

UNITED STATES PATENTS

| | | |
|---|---|---|
| 2,822,218 | Whitfield | Feb. 4, 1958 |
| 2,989,108 | Gore | June 20, 1961 |
| 3,025,898 | Opel | Mar. 20, 1962 |

FOREIGN PATENTS

| | | |
|---|---|---|
| 237,565 | Great Britain | Feb. 25, 1926 |
| 468,734 | Great Britain | July 12, 1937 |
| 956,380 | Germany | Jan. 17, 1957 |
| 219,893 | Australia | Jan. 29, 1959 |